UNITED STATES PATENT OFFICE.

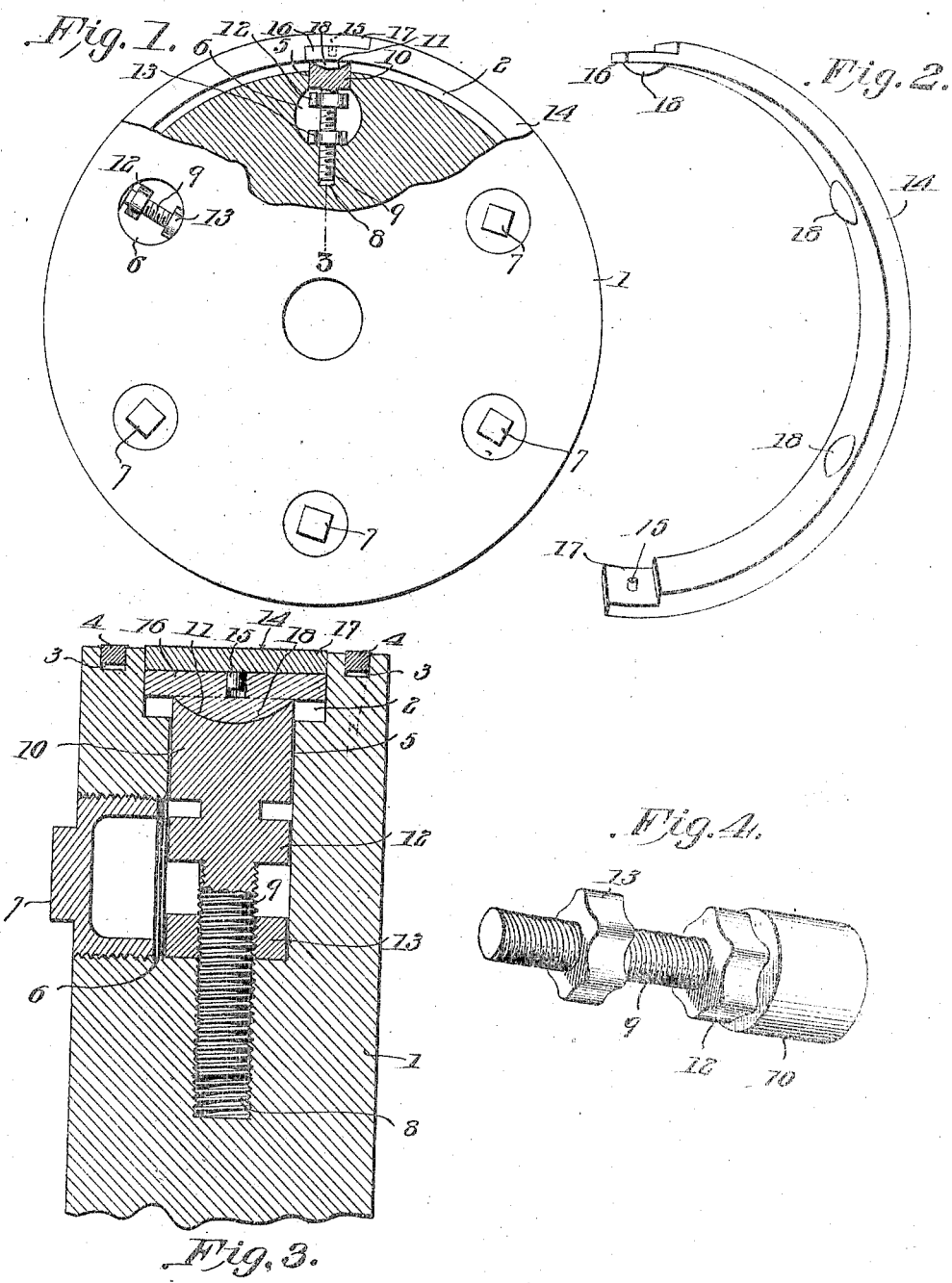

EDWARD MORAN, OF LOWELL, WASHINGTON.

PISTON.

No. 817,330.	Specification of Letters Patent.	Patented April 10, 1906.

Application filed July 17, 1905. Serial No. 270,[...]

*To all whom it may concern:*

Be it known that I, EDWARD MORAN, a citizen of the United States, residing at Lowell, in the county of Snohomish and State of Washington, have invented a new and useful Piston, of which the following is a specification.

This invention relates to pistons, and has for its object to provide a device of the class embodying new and improved features of durability and accuracy of adjustment.

A further object of the invention is to provide a piston having a ring of soft metal which may be expanded radially to compensate for any wear occasioned by use.

A further object of the invention is to provide a piston having a wear-ring and means for moving the ring diametrically of the piston to center the piston in the cylinder.

It is well known that through constant use a cylinder becomes worn, especially at the lower end of a horizontal cylinder, which makes it impossible for the packing-rings to form a steam-tight joint, necessitating the reboring of the cylinders from time to time.

It is an object of this invention to provide a piston with a soft-metal wear-ring which will cause but a minimum amount of wear upon the cylinder and which may be radially expanded at any point sufficiently to compensate for wear of the ring itself, said ring being formed of a plurality of sections, so that the sections may at any time be replaced by new sections when the wear renders it desirable.

It is well known that a piston, especially in a high-pressure steam-cylinder, is subjected to very great strain, and to provide for such strain it is an object of this invention to provide a solid integral piston having radial apertures in which are seated screws for expanding the soft-metal wear-ring and with openings in the face of the piston communicating with the radial apertures to permit the manipulating of the screws from the face of the piston and to provide closures for the openings.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings thus employed, Figure 1 is a view of the improved piston, in front elevation, with a portion broken away, showing one of the ring-expanders. Fig. 2 is a perspective view of one of the sections of the expansible wear-ring. Fig. 3 is a fragmentary diametrical sectional view taken on line 3 of Fig. 1. Fig. 4 is a perspective view of one of the ring-expanders.

Like characters of reference indicate corresponding parts in all of the figures of the drawings.

In its preferred embodiment the improved piston forming the subject-matter of this application comprises a piston-head 1, which may be solid and integral and provided with a groove 2 in the middle of its peripheral face. Upon either side of the groove 2 may be formed grooves 3, in which is disposed metallic spring-packing 4 of the usual construction. Within the groove 2 are formed a plurality of radial apertures 5, and communicating therewith are equal number of openings 6 through the face of the piston-head. The openings 6 are internally threaded, and a screw-threaded plug 7 is threaded in each opening to close the same. Communicating with the radial apertures are threaded openings 8, within which are threaded screws 9, having heads 10, substantially filling the outer ends of the apertures 5, and each provided with a cupped face 11. Adjacent the heads 10 the screws 9 are provided with integral or rigid rosettes 12 and rose jam-nuts 13.

Within the groove 2 is disposed a ring 14, of any approved soft metal, as brass, formed in any desired number of interchangeable sections, the ends of which are provided with any approved interlocking means, as the stud 15, rigid with one halved end 16 and arranged to engage within a socket in the oppositely-formed halved end 17. At spaced points about the sections of the ring 14 are formed a plurality of cones or concaved bearing-plates 18, adapted to be engaged by the concavities 11 of the screw-head 10.

From the foregoing it will be understood that by removing the plugs 7 the screws 9 may be rotated by means of a chisel or punch engaging the rosette 12 and driven by a hammer. The rotation of the screw 9 in either direction moves the ring 14 away from or permits it to move toward the center of the piston-head, enabling the operator to accurately center the piston within the cylinder or to compensate for wear of the ring. When the desired adjustment has been obtained, the screw 9 may be secured against displacement by turning the rose jam-nut 13 to engage forcibly the bottom of aperture 5, after which the plug 7 is replaced, thereby effectually closing communication between the cylinder and the radial aperture. When the ring or any section thereof has become worn to an inoperative extent, new sections may be substituted at a very small expense.

The piston as above described being formed integral possesses all the advantages of strength and durability of the piston in common use known as the "box" piston, and embodies no plates or followers to become loosened, misplaced, or broken.

Having thus described the invention, what is claimed is—

1. In combination a piston-head having a peripheral groove, a radial aperture communicating with the groove an opening intermediate the center and circumference communicating with the aperture, an expansible wear-ring mounted in the groove and provided with a conical bearing-plate, means disposed in the aperture and engaging the bearing-plate for expanding the ring and arranged to be manipulated through the opening, and a closure for the opening.

2. In combination, a piston-head having a peripheral groove, an expansible wear-ring disposed within the groove and provided upon its inner surface with spaced bearing-plates, and means disposed within the head proportioned to engage the bearing-plates and to exert a radial pressure upon the ring.

3. In combination, a piston-head having a peripheral groove and openings in the face, an expansible wear-ring disposed within the groove provided upon its inner surface with spaced conical bearing-plates, and means disposed within the head proportioned for engagement with the conical plates for manipulation through the face-openings to exert a radial pressure upon the ring.

4. In combination, a piston-head having a peripheral groove and openings through the face communicating with the groove, an expansible wear-ring disposed within the groove and provided upon its inner surface with spaced conical bearing-plates, screws disposed radially within the head and provided with cupped extremities proportioned to engage with the bearing-plates and to be manipulated through the openings, jam-nuts upon the screws disposed for manipulation through the openings and closures for the openings.

In testimony that I claim the foregoing as my own I have hereto affixed my signature in the presence of two witnesses.

EDWARD MORAN.

Witnesses:
FRANK KNOTHE,
J. C. MCCORMACK.